(12) United States Patent
Imura

(10) Patent No.: US 8,502,980 B2
(45) Date of Patent: Aug. 6, 2013

(54) SPECTRAL CHARACTERISTIC MEASURING SYSTEM, SPECTRAL CHARACTERISTIC MEASURING INSTRUMENT, AND DATA PROCESSING DEVICE

(75) Inventor: Kenji Imura, Toyohashi (JP)

(73) Assignee: Konica Minolta Sensing, Inc, Osaka (JP)

( * ) Notice: Subject to any disclaimer, the term of this patent is extended or adjusted under 35 U.S.C. 154(b) by 335 days.

(21) Appl. No.: 12/934,247

(22) PCT Filed: Mar. 16, 2009

(86) PCT No.: PCT/JP2009/055049
§ 371 (c)(1),
(2), (4) Date: Sep. 23, 2010

(87) PCT Pub. No.: WO2009/119367
PCT Pub. Date: Oct. 1, 2009

(65) Prior Publication Data
US 2011/0019192 A1    Jan. 27, 2011

(30) Foreign Application Priority Data
Mar. 28, 2008    (JP) ................................ 2008-086659

(51) Int. Cl.
*G01J 3/46* (2006.01)
(52) U.S. Cl.
USPC ....................................................... 356/402
(58) Field of Classification Search
USPC ............................... 356/300, 402
See application file for complete search history.

(56) References Cited

U.S. PATENT DOCUMENTS

| | | | |
|---|---|---|---|
| 4,890,933 A * | 1/1990 | Amith et al. | 374/121 |
| 5,307,146 A * | 4/1994 | Porter et al. | 356/408 |
| 5,754,283 A | 5/1998 | Keane et al. | |
| 5,964,712 A | 10/1999 | Kubo et al. | |
| 6,262,804 B1 | 7/2001 | Friend et al. | |
| 6,732,917 B1 | 5/2004 | Benz et al. | |
| 2003/0058447 A1 | 3/2003 | Yamada et al. | |
| 2005/0047299 A1* | 3/2005 | Kikuchi et al. | 369/53.2 |

FOREIGN PATENT DOCUMENTS

| | | |
|---|---|---|
| JP | 08-114503 A | 5/1996 |
| JP | 09-166546 A | 6/1997 |
| JP | 2000-505887 A | 5/2000 |

(Continued)

OTHER PUBLICATIONS

International Search Report in International Application No. PCT/JP2009/055049, mailed Apr. 14, 2009, 12 pages.

*Primary Examiner* — Kara E Geisel
(74) *Attorney, Agent, or Firm* — Brinks Hofer Gilson & Lione

(57) ABSTRACT

A spectral characteristic measuring system includes, a data processing apparatus, and a program, which correct an illumination light variation caused by a temperature rise in a semiconductor light-emitting element due to light emission or in a scanning type color measurement system, which sequentially measures color samples 1n and in which a semiconductor light-emitting element is used as a light source. Spectral distributions of illumination lights which are measured before and after the color sample is measured are interpolated, to estimate a spectral distribution of an illumination light at the time when a spectral distribution of the color sample is obtained. Spectral characteristics of the color sample are identified based on the spectral distribution of the reflected light or the transmitted light reflected by or transmitted through the color sample and the estimated spectral distribution.

6 Claims, 10 Drawing Sheets

FOREIGN PATENT DOCUMENTS

| | | |
|---|---|---|
| JP | 2003-057115 A | 2/2003 |
| JP | 2003-521701 A | 7/2003 |
| JP | 02-147837 A | 6/2006 |
| WO | WO 96/13709 A1 | 5/1996 |
| WO | WO 2009/119367 A1 | 10/2009 |

* cited by examiner

F I G . 4
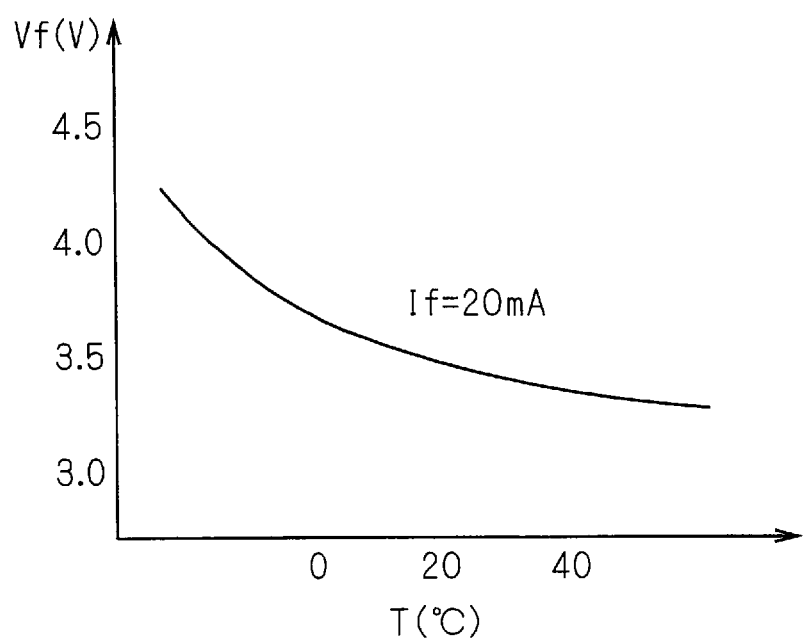

US 8,502,980 B2

SPECTRAL CHARACTERISTIC MEASURING SYSTEM, SPECTRAL CHARACTERISTIC MEASURING INSTRUMENT, AND DATA PROCESSING DEVICE

TECHNICAL FIELD

The present invention relates to a technique of measuring spectral characteristics of a plurality of color samples for correction of printing colors of a printing apparatus such as a color printer.

BACKGROUND ART

For correction of printing colors of a printing apparatus such as a color printer, firstly, print data is inputted to a printing apparatus which is a correction object, to cause the apparatus to print a plurality of color samples. Then, spectral characteristics of the many printed color samples having different color tones and densities are measured. Printing colors of the printing apparatus are corrected based on a difference between a measured value of the spectral characteristics of each color sample and a reference value of the spectral characteristics which is an intended value each color sample should have.

However, often a huge number of color samples have to be measured, and it is troublesome and takes much time to measure colors of the samples by an ordinary colorimeter of manual operation type.

In a conventional technique, a scanning type color measurement system has been practically used, in which a color measurement apparatus scans a two-dimensional array of samples in a row direction of the array while a paper is transported in a column direction of the array, so that each sample in the array is automatically measured (for example, see Patent Document 1).

Patent Document 1: Specification of U.S. Pat. No. 6,732,917

DISCLOSURE OF THE INVENTION

Problems to be Solved by the Invention

A color measurement apparatus, for example, includes an illumination system that illuminates a sample, and a light receiving system that receives a reflected light reflected by the sample and obtains spectral characteristics of the reflected light. In the color measurement apparatus, a color value of the sample is calculated after the spectral reflection characteristics of the sample are obtained. As a light source of the illumination system of the color measurement apparatus, a conventionally used incandescent lamp is being replaced by, for example, an LED (Light Emitting Diode) which is a semiconductor light-emitting element excellent in lifespan and efficiency. An illumination light of the LED varies due to a change of light emission characteristics which is caused by a temperature rise in an LED chip owing to light emission, and a change of an illumination optical system including the LED. Particularly, an influence of the change of the light emission characteristics which is caused by a temperature rise in the LED chip is large. In recent years, in a color measurement system, there is a tendency that a reference system including a spectrophotometer for monitoring an illumination light is not provided for cost reduction. In such a case, in a scanning type color measurement system which sequentially measures many color samples, even when an illumination light varies, the variation cannot be timely detected, which is a significant factor in a measured value error.

Therefore, an object of the present invention is to make it possible to appropriately correct an influence of an illumination light variation caused by a temperature rise in a semiconductor light-emitting element due to light emission, in a scanning type color measurement system or the like which sequentially measures many color samples and in which a semiconductor light-emitting element such as an LED is used as a light source and a reference system is not provided.

Means for Solving the Problems

To solve the above-described problem, a spectral characteristic measuring system according to a first aspect is a spectral characteristic measuring system which obtains spectral characteristics of a color sample by using an illumination light from a semiconductor light-emitting element. The spectral characteristic measuring system includes a measurement control section, an interpolation section, and a spectral characteristics computation section. The measurement control section controls a measurement section so as to measure a spectral distribution L1 corresponding to the illumination light to obtain a spectral distribution D1 of the illumination light, then measure a spectral distribution Lx of a reflected light or a transmitted light reflected by or transmitted through the color sample illuminated by the illumination light, and then measure a spectral distribution L2 corresponding to the illumination light to obtain a spectral distribution D2 of the illumination light. The interpolation section that estimates a spectral distribution Dx of the illumination light at the time when the spectral distribution Lx of the reflected light or the transmitted light reflected by or transmitted through the color sample illuminated by the illumination light is measured by interpolating the spectral distribution D2 obtained based on the spectral distribution L1 and the spectral distribution D2 obtained based on the spectral distribution L2. The spectral characteristics computation section obtains spectral characteristics Cx of the color sample based on the spectral distribution Lx and the spectral distribution Dx.

A spectral characteristic measuring system according to a second aspect is the spectral characteristic measuring system according to the first aspect. In the spectral characteristic measuring system according to the second aspect, the measurement section includes a forward voltage detection section that detects a forward voltage Vf1 of the semiconductor light-emitting element at a timing when the spectral distribution L1 is measured, a forward voltage Vf2 of the semiconductor light-emitting element at a timing when the spectral distribution L2 is measured, and a forward voltage Vfx of the semiconductor light-emitting element at a timing when the spectral distribution Lx is measured. The interpolation section performs a calculation for estimating the spectral distribution Dx by interpolating the spectral distributions D1 and D2 using a value of the forward voltage as the parameter for interpolation based on values of the forward voltages Vf1, Vf2, and Vfx.

A spectral characteristic measuring system according to a third aspect is the spectral characteristic measuring system according to the second aspect. In the spectral characteristic measuring system according to the third aspect, the spectral characteristic measuring system includes a plurality of semiconductor light-emitting elements that emit lights with different spectral distributions. The measurement of the spectral distributions L1 and L2 is performed with respect to each of the semiconductor light-emitting elements, by individually and sequentially lighting the plurality of semiconductor light-emitting elements, and on the other hand. The measurement of the spectral distribution Lx is performed by simultaneously lighting the plurality of semiconductor light-emitting elements. The forward voltage detection section detects a forward voltage of each of the semiconductor light-emitting elements. The interpolation section includes: an individual estimate section that individually estimates a spectral distribution Dxm of an illumination light emitted from each of the semiconductor light-emitting elements by using, as interpolation parameters, values of the forward voltages detected with respect to each of the semiconductor light-emitting elements; and a combination section that combines the spectral distribution Dxm which has been estimated by the individual estimate section with respect to each of the semiconductor light-emitting emitting elements, to obtain the spectral distribution Dx.

A spectral characteristic measuring system according to a fourth aspect is the spectral characteristic measuring system according to the first aspect. In the spectral characteristic measuring system according to the fourth aspect, a color sample sheet in which a plurality of color samples are arranged is used as a collection of the color samples. Timings of measuring the spectral distributions Lx of the reflected lights or transmitted lights reflected by or transmitted through the plurality of color samples, respectively, illuminated by the illumination lights are sequential along time. The interpolation computation performed by the interpolation section for estimating the spectral distribution Dx is performed with respect to each of the timings of measuring the spectral distributions Lx of the reflected lights or the transmitted lights reflected by or transmitted through the plurality of colored samples, respectively, illuminated by the illumination lights.

A spectral characteristic measuring system according to a fifth aspect is the spectral characteristic measuring system according to the first aspect. In the spectral characteristic measuring system according to the fifth aspect, the interpolation section performs the interpolation computation by using, as interpolation parameters, time differences between ones of timings of measuring the spectral distributions L1, Lx, and L2.

A spectral characteristic measuring system according to a sixth aspect is the spectral characteristic measuring system according to the first aspect, in which the spectral distributions L1 and L2 are obtained by, while illuminating a reference sample having predetermined spectral characteristics by means of the semiconductor light-emitting element, measuring a reflected light or a transmitted light reflected by or transmitted through the reference sample.

A spectral characteristic measuring instrument according to a seventh aspect includes a measurement section, a scanning section, and a signal generation section. The measurement section includes a light source and a light receiving section, the light source having a semiconductor light-emitting element that produces an illumination light, the light receiving section receiving, as a light-to-be-measured, a reflected light or a transmitted light reflected by or transmitted through an illumination object illuminated by the semiconductor light-emitting element. The scanning section moves the measurement section in a spatial range covering a reference sample and a color sample. The signal generation section generates and outputs complex information in which a spectral distribution obtained from the light-to-be-measured and a value of a forward voltage of the semiconductor light-emitting element at the time when the spectral distribution is measured are associated with each other.

A data processing apparatus according to an eighth aspect is a data processing apparatus to which the complex information generated in the spectral characteristic measuring instrument according to the seventh aspect is inputted, and which outputs spectral characteristics Cx of the color sample. The data processing apparatus includes an input section, an interpolation section, and a spectral characteristics computation section. Inputted to the input section are, as information included in the complex information: a first spectral distribution L1 corresponding to the illumination light, which is associated with a first value of the forward voltage, a second spectral distribution L2 corresponding to the illumination light, which is associated with a second value of the forward voltage, and a third spectral distribution Lx of a reflected light or a transmitted light reflected by or transmitted through the color sample illuminated by the illumination light, which is associated with a third value of the forward voltage. The interpolation section estimates a spectral distribution Dx of the illumination light which corresponds to the third value of the forward voltage, by interpolating a spectral distribution D1 of the illumination light which is obtained based on the first spectral distribution L1 and a spectral distribution D2 of the illumination light which is obtained based on the second spectral distribution L2, using the value of the forward voltage as the parameter for interpolation based on the first to third values of the forward voltage. The spectral characteristics computation section obtains spectral characteristics Cx of the color sample, based on the spectral distribution Dx estimated by the interpolation section and the third spectral distribution Lx.

Effects of the Invention

In the spectral characteristic measuring system according to the first aspect, the spectral distributions of the illumination lights which are obtained before and after the color sample is measured are interpolated to thereby estimate the spectral distribution of the illumination light at the time when the spectral distribution of the reflected light or the transmitted light reflected by or transmitted through the color sample is obtained. The spectral characteristics of the color sample are obtained based on the spectral distribution of the reflected light or the transmitted light reflected by or transmitted through the color sample and the estimated spectral distribution. Therefore, an illumination light variation caused by a temperature rise in the semiconductor light-emitting element due to light emission can be appropriately corrected, and the spectral characteristics of the color sample can be obtained with a high accuracy.

In the spectral characteristic measuring system according to the second aspect, the forward voltage of the semiconductor light-emitting element, which has a correlation with a temperature (junction temperature) of a chip of the semiconductor light-emitting element, is detected. The interpolation computation is performed on the spectral distributions of the illumination lights by using the values of the forward voltage as interpolation indexes. Therefore, the spectral distribution of the illumination light at the time when the color sample is measured can be estimated with a good accuracy, and the spectral characteristics of the color sample can be obtained with a high accuracy.

In the spectral characteristic measuring system according to the third aspect, the plurality of semiconductor light-emitting elements having different spectral intensities are used as the light source. The illumination light is estimated for each semiconductor light-emitting element m, by performing the interpolation based on the forward voltage at the time when the color sample is measured. The respective illumination lights which have been estimated are combined to obtain the spectral distribution of the illumination light at the time when the color sample is measured. Therefore, over a wide wavelength band (for example, the entire visible range of 400 to 700 nm), the spectral characteristics of the color sample can be obtained with a high accuracy and at a low cost.

In the spectral characteristic measuring system according to the fourth aspect, the color sample sheet in which the plurality of color samples are arranged is used as the collection of the color samples. The interpolation computation for estimating the spectral distribution of the illumination light illuminating each of the plurality of color samples is also performed for each of the timings of measuring the spectral distributions of the reflected lights or the transmitted lights reflected by or transmitted through the plurality of color samples, respectively. The measurements of the spectral characteristics of the plurality of color samples can be performed in one scanning, so that the spectral characteristics of the plurality of color samples can be measured at a high speed and with a high accuracy.

In the spectral characteristic measuring system according to the fifth aspect, the interpolation process is performed by using, as the interpolation indexes, the time differences among when the spectral distributions of the illumination lights are obtained and when the spectral distribution of the reflected light or the transmitted light reflected by or transmitted through the illuminated color sample is measured, in a case where obtaining the spectral distributions of the illumination lights and measuring the spectral distribution of the reflected light or the transmitted light reflected by or transmitted through the illuminated color sample are sequentially performed. Therefore, an illumination light variation caused by a temperature rise in the semiconductor light-emitting element due to light emission can be appropriately corrected, and the spectral characteristics of the color sample can be obtained with a high accuracy.

In the spectral characteristic measuring system according to the sixth aspect, the spectral distributions of the illumination lights are obtained by, while illuminating the reference sample having the predetermined spectral characteristics by means of the semiconductor light-emitting element, measuring the reflected light or the transmitted light reflected by or transmitted through the reference sample. Therefore, the spectral characteristics of the color sample can be obtained with a high accuracy.

In the spectral characteristic measuring instrument according to the seventh aspect, there is provided the signal generation section that generates and outputs the complex information in which the spectral distribution obtained from the reflected light or the transmitted light reflected by or transmitted through the illumination object illuminated by the semiconductor light-emitting element and the value of the forward voltage of the semiconductor light-emitting element at the time when the spectral distribution is obtained are associated with each other. Therefore, the spectral characteristic measuring instrument according to the seventh aspect is applicable to the system according to the invention of claim 1, and a signal serving as data for obtaining the spectral characteristics of the color sample with a high accuracy can be obtained.

In the data processing apparatus according to the eighth aspect, there are provided the input section that inputs thereto the complex information generated in the spectral characteristic measuring instrument according to the seventh aspect, the estimate computation section that estimatingly computes a spectral distribution of the illumination light, and the spectral characteristics computation section that obtains the spectral characteristics of the color sample. This makes it possible to interpolate the spectral distributions by using the value of the forward voltage as the interpolation index to thereby estimatingly compute the spectral distribution of the illumination light, and obtain the spectral characteristics of the color sample based on the estimated spectral distribution of the illumination light and the spectral distribution of the reflected light or the transmitted light reflected by or transmitted through the illuminated color sample. Therefore, the data processing apparatus according to the eighth aspect is applicable to the spectral characteristic measuring system according to the first aspect. The spectral distribution of the illumination light at the time when the color sample is measured can be estimated with a good accuracy, and the spectral characteristics of the color sample can be obtained with a high accuracy.

BRIEF DESCRIPTION OF THE DRAWINGS

FIG. 4 is a graph showing a temperature dependency of a forward voltage of a white LED driven with a constant current.

BEST MODE FOR CARRYING OUT THE INVENTION

Hereinafter, embodiments of the present invention will be described based on the drawings.

<First Embodiment>
<General Configuration of Spectral Characteristic Measuring System>

Figure 1:
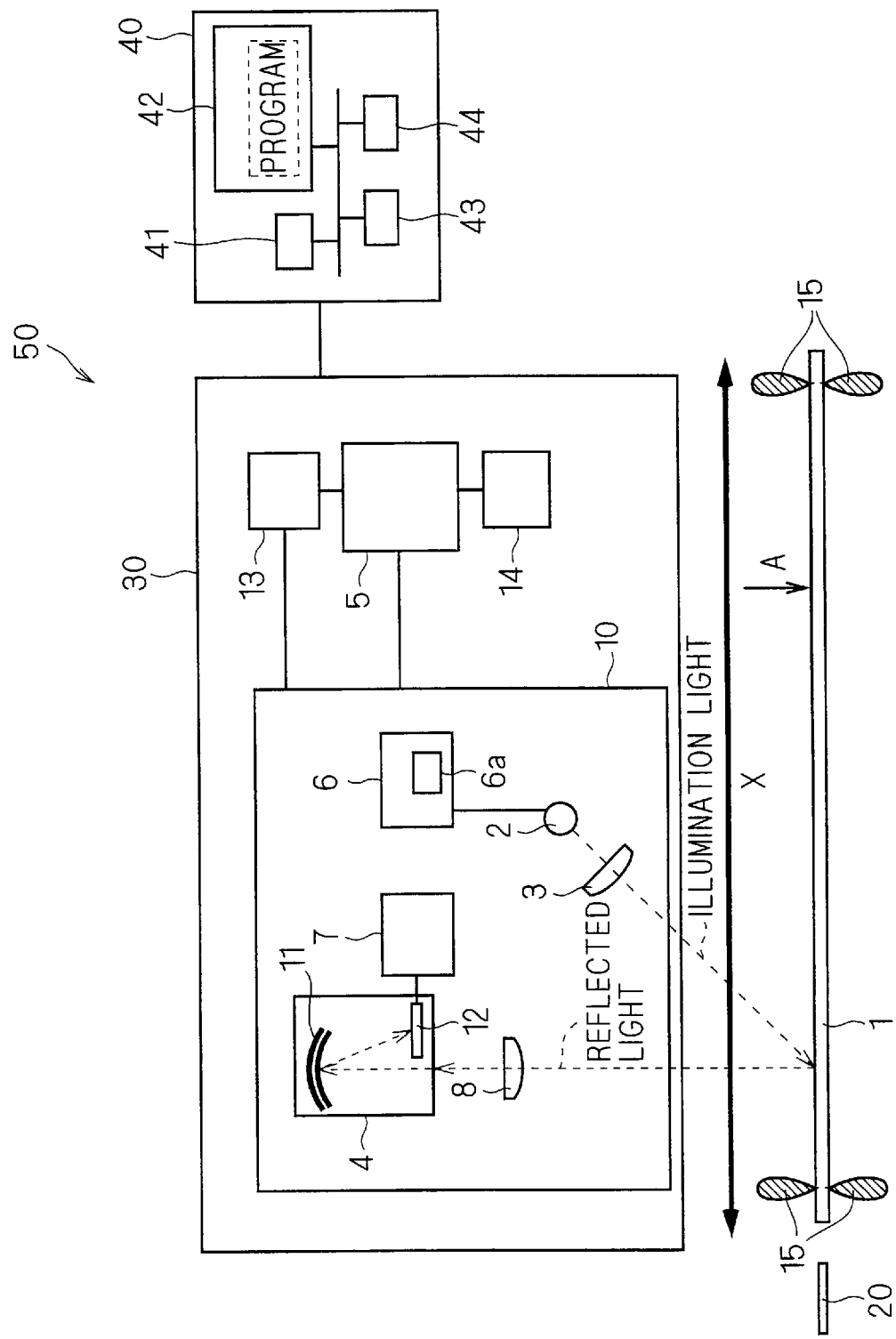
FIG. 1 schematically shows a spectral characteristic measuring system 50 according to a first embodiment of the present invention.
Figure 2:
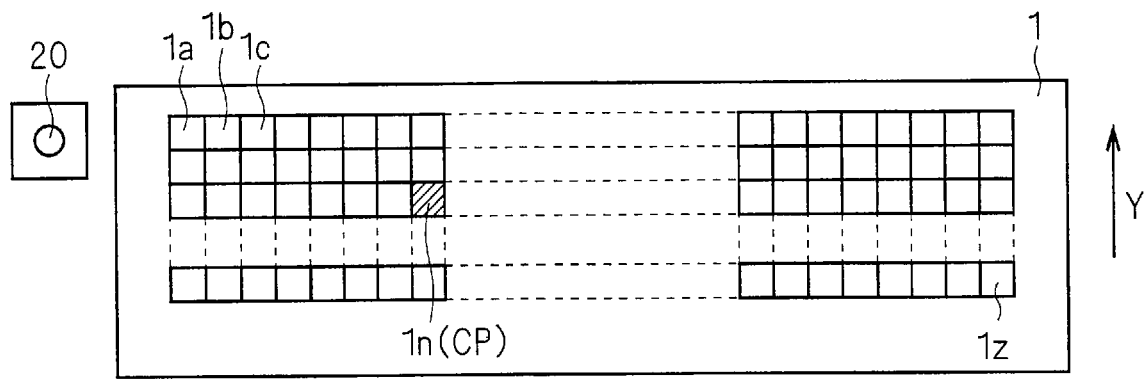
FIG. 2 is a plan view showing a color sample sheet 1 as seen in a direction indicated by the arrow A in FIG. 1.

FIG. 1 schematically shows a spectral characteristic measuring system 50 according to a first embodiment of the present invention. FIG. 2 is a plan view showing a color sample sheet 1 as seen in a direction indicated by the arrow A in FIG. 1. The spectral characteristic measuring system 1 measures a spectral reflectance factor of each of a plurality of color samples 1a, 1b, 1c, . . . , 1z (hereinafter typically designated as a "color sample 1n") on the color sample sheet 1 printed by a printing apparatus which is a correction object, and corrects a printing color of the printing apparatus based on a difference between a measured value of the spectral reflectance factor of a color sample $1n$ and a reference value of the spectral reflectance factor which is an intended value the color sample $1n$ should have. As shown in FIG. 1, the spectral characteristic measuring system 50 includes a spectral characteristic measuring instrument 30 and a data processing apparatus 40. The spectral characteristic measuring instrument 30 and the data processing apparatus 40 are connected to each other via a USB interface, and mutual data communication is allowed therebetween. The spectral characteristic measuring instrument 30 includes a measurement section 10, a control section 5, a scanning section 13, and a transport control circuit 14.

The measurement section 10 includes a light source 2, a lens element 3, a lens element 8, a polychromator 4, a control section 5, a drive circuit 6, and a signal processing circuit 7.

The light source 2 is made up of a semiconductor light-emitting element such as a white LED, and continuously radiates an illumination light to the color sample sheet 1. The white LED emits an illumination light having an intensity corresponding to a supplied current. By the adoption of the white LED as the light source 2, a white illumination light can be radiated to each color sample $1n$. The light source 2 radiates the illumination light to the color sample sheet 1, from a direction 45 degrees with respect to the normal line of the color sample sheet 1.

The lens element 3 guides the illumination light emitted from the light source 2 to a measurement area to be measured by the polychromator 4.

The lens element 8 guides a reflected light reflected by the measurement area of the color sample sheet 1 to the polychromator 4.

The polychromator 4 receives from the color sample sheet $1a$ reflected light traveling in a normal line direction of the color sample sheet 1, and performs a spectrometry on the received reflected light. The polychromator 4 includes a concave diffraction grating 11 and a photo sensor array 12 (hereinafter simply called as a "sensor array").

The concave diffraction grating 11 disperses the reflected light into respective wavelengths. Needless to say, a wavelength dispersion element other than the concave diffraction grating 11 may be used to disperse the reflected light into the respective wavelengths.

The sensor array 12 is made up of photo sensor cells being arranged in one direction. The photo sensor cell outputs a signal in accordance with the amount of incident light. The sensor array 12 is installed such that an arrangement direction of sensors is a direction in which the concave diffraction grating 11 disperses the reflected light into the respective wavelengths. Lights obtained by dispersing the reflected light into the respective wavelengths are incident on corresponding pixels of the sensor array 12. The sensor array 12 performs a measurement in synchronization with an inputted clock. As the sensor array 12, for example, a CCD sensor or a CMOS sensor can be adopted, in which photoelectric conversion elements each generating an electric charge in accordance with the amount of incident light are arranged in one direction.

The drive circuit 6 drives the light source 2 in accordance with control of the control section 5 which will be described later. The drive circuit 6 controls a current If supplied to the light source 2 to be constant. Thus, even when a voltage of a not-shown power circuit varies, the current If supplied to the light source 2 does not change. Therefore, a variation in the illumination light intensity due to a variation in the voltage of the power circuit can be suppressed. Additionally, the drive circuit 6 is connected to the control section 5 and can switch the current If supplied to the light source 2 in accordance with the control of the control section 5. This enables the intensity of the illumination light emitted from the light source 2 to be changed. Moreover, the drive circuit 6 includes a forward voltage detection circuit $6a$. The forward voltage detection circuit $6a$ detects a forward voltage Vf of an LED chip included in the light source 2, generates a signal in accordance with the forward voltage Vf, and outputs the generated signal to the data processing apparatus via the control section 5.

Figure 3:
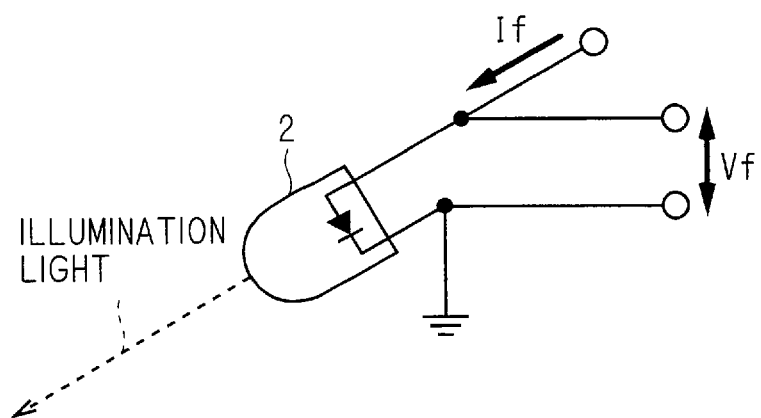
FIG. 3 schematically shows a current If supplied to a light source 2, and a forward voltage Vf of the light source 2.

FIG. 3 schematically shows the current If supplied to the light source 2 and the forward voltage Vf of the light source 2.

Referring to FIG. 1, the control section 5 determines an operation of the spectral characteristic measuring instrument 30 as a whole, and functions as a measurement control section, a forward voltage detection section, and a signal generation section. The control section 5 causes the measurement section 10 to measure a spectral distribution of the illumination light, a spectral distribution of the color sample $1n$, and the forward voltage of the light source 2. Further, the control section 5 causes the measurement section 10 to generate and output complex information in which the spectral distribution obtained from a light-to-be-measured and a value of the forward voltage are associated with each other. The control section 5 also controls driving of the scanning section 13 and the transport control circuit 14. The control section 5 inputs a scanning drive signal to the scanning section 13 and, based on the scanning drive signal, moves the measurement section 10 above each color sample $1n$ sequentially. At the timing when the measurement section 10 is brought into opposition to each color sample $1n$, the control section 5 causes the measurement section 10 to capture the spectral distribution and the forward voltage Vf.

The signal processing circuit 7 processes the signal of each pixel of the sensor array 12, and then transmits the processed signal, as spectral distribution information, to the control section 5.

The scanning section 13 is made up of a drive belt and an electric motor such as a pulse motor which is a rotation drive source. The drive belt is provided to the measurement section 10, and the measurement section 10 performs scanning by rotation of the drive belt which is caused by driving the pulse motor. In FIG. 1, a direction of scanning performed by the measurement section 10 is indicated by the arrow X. Thus, the measurement area can be moved along the one-dimensional arrangement of the color sample sheet 1. Therefore, the sensor array 12 repeats the measurement while the strip-shaped color sample sheet 1 is transported, so that the plurality of color samples $1n$ can be sequentially measured.

The transport control circuit 14 drives a transport mechanism for feeding the color sample sheet 1 in the Y direction. The transport mechanism is made up of pairs of rollers 15 and a not-shown electric motor such as a pulse motor which is a drive source of the pairs of rollers 15. The pairs of rollers 15 are rotated, to transport the color sample sheet 1 in the Y direction of the arrangement of the color samples $1n$ shown in FIG. 2. The pairs of rollers 15 cooperatively rotate while nipping the supplied color sample sheet 1, to transport each row in the color sample sheet 1 toward the measurement area.

As shown in FIG. 2, a plurality of color samples $1n$ are two-dimensionally arranged. The color sample sheet 1 is a sheet-type color chart (in which hundreds of color samples $1n$ or color patches CP are arranged in a grid pattern) prepared by a color printer or a printing machine. When the electric motor is driven, the pairs of rollers 15 are rotated, so that the color sample sheet 1 pinched between the rollers is fed in the rotation direction (Y direction) of the pairs of rollers 15. By controlling the driving direction of the electric motor, the rotation direction of the pairs of rollers 15 is controlled, and thereby the feeding direction of the color sample sheet 1 is controlled. Therefore, in the color measurement apparatus 1 according to the present embodiment, the movement of the color sample sheet 1 in the Y direction and the movement of the measurement section 10 in the X direction are combined with each other to thereby move the measurement section 10 in a predetermined direction relative to the color sample sheet 1, so that the measurement section 10 is sequentially brought into opposition to each color sample 1$n$ (color patch CP) and a color measurement for the color sample 1$n$ is automatically performed.

The measurement section 10 performs scanning along the row direction X of the color sample arrangement, and the color sample sheet 1 is transported along the column direction Y. Thereby, for each color sample 1$n$ in the arrangement, a spectral distribution $Dx(\lambda)$ of a reflected light is measured, and the forward voltage Vfx at that time is measured. A reference white board (reference white surface) 20 having a known spectral reflectance factor is disposed at a starting end of the X direction scanning The measurement section 10 starts one reciprocating scanning from this point, and after scanning returns to this point. The entire color sample 1$n$ is read by the measurement section 10 repeating such reciprocating scanning in the X direction. Here, as a scanning mode, there are a one-way-read scanning mode and a two-way-read scanning mode.

Among them, in the one-way-read scanning mode, the following steps are performed as a unit reciprocation process.

(1) A first read step of reading the reference white surface: reading a spectral distribution of a reflected light reflected by the reference white board (reference white surface) 20 at the time when the first half of the scanning starts from the origin in the X direction;

(2) a color sample read step: sequentially reading a spectral distribution of a reflected light reflected by each color sample 1$n$ included in one row during the first half;

(3) an origin return step: returning to the origin in the X direction;

(4) a second read step of reading the reference white surface: reading a spectral distribution of a reflected light reflected by the reference white board (reference white surface) 20 at the end of the second half of the scanning; and (5) a sheet feed step: transport the color sample sheet 1 in the Y direction by a distance corresponding to one row of the color samples 1$n$.

This unit reciprocation process is repeated a number of times corresponding to the number of color sample rows included in the color sample sheet 1. In the subsequent unit reciprocation processes, the first read step of reading the reference white surface in a unit reciprocation process may be realized by the second read step of reading the reference white surface in the previous unit reciprocation process.

On the other hand, in the two-way-read scanning mode, the color samples 1$n$ included in one row are read in the first half of the one reciprocating scanning, and additionally the color samples 1$n$ included in the next one row are read in the second half. In this case, the sheet feed step is also provided immediately after the color sample read step of reading one row of color samples in the first half, and the origin return step serves as the color sample read step of reading next one row in the second half. In this case as well, the second read step of reading the reference sample in a unit reciprocation process may also realize the first read step of reading the reference sample in the next unit reciprocation process.

○=read the reference white surface
A=scan and read one row of color samples in the first half
B=scan and read one row of color samples in the second half
*=return to the origin (without reading and scanning)

When the respective steps are expressed as the above marks and indication of the feeding of the color sample sheet 1 in the Y direction is omitted, the above-described one-way-read scanning mode has the temporal sequence of

○A*○A*○A* . . . A*○, and the two-way-read scanning mode has the temporal sequence of

○AB○AB○AB○ . . . B○.

The reading of the reference white surface may be performed only before and after the reading and scanning of all the color samples included in the color sample sheet 1 (continuous reading mode). In this case, the temporal sequence is

○A*A*A*A* . . . A*○ or

○ABABABAB . . . AB○.

Hereinafter, a collection of color samples included in one row in the case of the one-way-read scanning mode, a collection of color samples included in two rows in the case of the two-way-read scanning mode, and a collection of color samples included in all rows in the case of the continuous reading mode, are called "a group of color samples".

In any of these cases, a spectral distribution of a reflected light reflected by the reference white board (reference white surface) 20, and the forward voltage at that time are measured before and after one or more rows are scanned. In the following, unless otherwise noted, the description will be continuously given taking the one-way-read scanning mode as an example.

Here, for example, the white LED used in the light source 2 is excellent in lifespan and efficiency, but a spectral distribution of an illumination light varies due to heat generation caused by light emission. When a reference system for independently monitoring the spectral distribution of the illumination light is not provided in a spectral characteristic measuring system for cost reduction, the variation in the illumination light is a significant factor in an error of obtained spectral reflection characteristics of the color sample 1$n$. Thus, in the spectral characteristic measuring system 50 according to the first embodiment of the present invention, before and after the color sample 1$n$ is scanned, the reference white board (reference white surface) 20 is measured to obtain a spectral distribution of an illumination light, and a spectral distribution of an illumination light at the time when each color sample is measured is estimated based on the obtained two spectral distributions, as will be detailed below.

As the reference white board (reference white surface) 20, for example, used is a board with a white surface whose spectral reflectance factor at a pitch of 10 nm is known, such as the working standard white surface specified in "JIS Z 8722 Color Measuring Method—Reflection and Transmission Object Colors, Section 5.3.4".

The data processing apparatus 40 includes a control section 41, a storage section 42, an input section 43, and an output section 44.

The control section 41 is made up of a central processing unit (CPU) for example, and executes a program stored in the storage section 42, to thereby determine an operation of the whole of the data processing apparatus 40, give a command to the whole of the data processing apparatus 40, and perform an arithmetic processing on data transmitted from the input section 43. The control section 41 realizes functions including an estimate computation section, a spectral characteristics computation section, and the like. The estimate computation section, using the value of the forward voltage as an interpolation index, interpolates the spectral distributions of the illumination lights illuminating the reference white surface, and estimatingly computes the spectral distribution Dx of the illumination light illuminating the color sample 1n. The spectral characteristics computation section obtains a spectral reflectance factor Rx serving as a typical feature quantity representing spectral characteristics Cx of the color sample 1n, based on the estimated spectral distribution Dx of the illumination light illuminating the color sample 1n and a spectral distribution Lx of a reflected light or a transmitted light reflected by or transmitted through the illuminated color sample 1n. The control section 41 causes the storage section 42 to store processed information.

The storage section 42 is made up of a storage device such as a semiconductor memory, and stores programs executed by the control section 41, information necessary for executing the programs, information inputted from the input section 43, and the like.

The input section 43 inputs information outputted from the spectral characteristic measuring instrument 30 via the USB cable, and transmits the inputted information to the control section 41.

The output section 44 outputs information processed by the control section 41.

An interpolation process (described later) which is a characteristic function of the data processing apparatus 40 may be performed by dedicated hardware, but in this embodiment realized by a computer. The interpolation process can be performed by a program stored in a storage medium being installed in the computer. As a usable storage medium, all of recording media capable of recording a program may be mentioned.

Alternatively, the computer or the like can implement the present invention by receiving a program via a communication network and executing the program. In the forgoing embodiment, the program may be recorded on a computer-readable recording medium such as a semiconductor memory or a hard disk device. The recording medium may be a recording medium which is readable by being inserted into a program reading device provided as a not-shown external storage device, for example. Alternatively, the recording medium may be a storage device of another device.

<Measurement of Spectral Reflection Characteristics of Color Sample>

FIG. 4 is a graph showing a temperature dependency of a forward voltage of a white LED driven with a constant current. The horizontal axis of the graph represents the junction temperature of the white LED, and the vertical axis of the graph represents the forward voltage of the white LED.

As shown in FIG. 4, the forward voltage Vf of the LED driven with the constant current has a correlation with a temperature (junction temperature) of an LED chip. Therefore, by using the spectral distributions $D1(\lambda)$ and $D2(\lambda)$ of the two illumination lights which are obtained by the measurements of the reference white board (reference white surface) 20 before and after the above-described scanning, interpolation is performed by using, as the interpolation indexes, distances on the Vf axis between the forward voltages Vf1, Vf2 which are measured simultaneously with the respective spectral distributions, and the forward voltage Vfx which is obtained when each color sample 1n (hereinafter also referred to as a color sample x using an identification code x) included in one row is measured, and the spectral distribution $Dx(\lambda)$ of the illumination light at the time when the color sample x is measured is estimated. The spectral reflection characteristics $Cx(\lambda)$ of the color sample x are obtained based on the estimated spectral distribution $Dx(\lambda)$ of the illumination light at the time when the color sample x is measured and the spectral distribution $Lx(\lambda)$ of a reflected light reflected by the illuminated color sample x.

Figure 5:
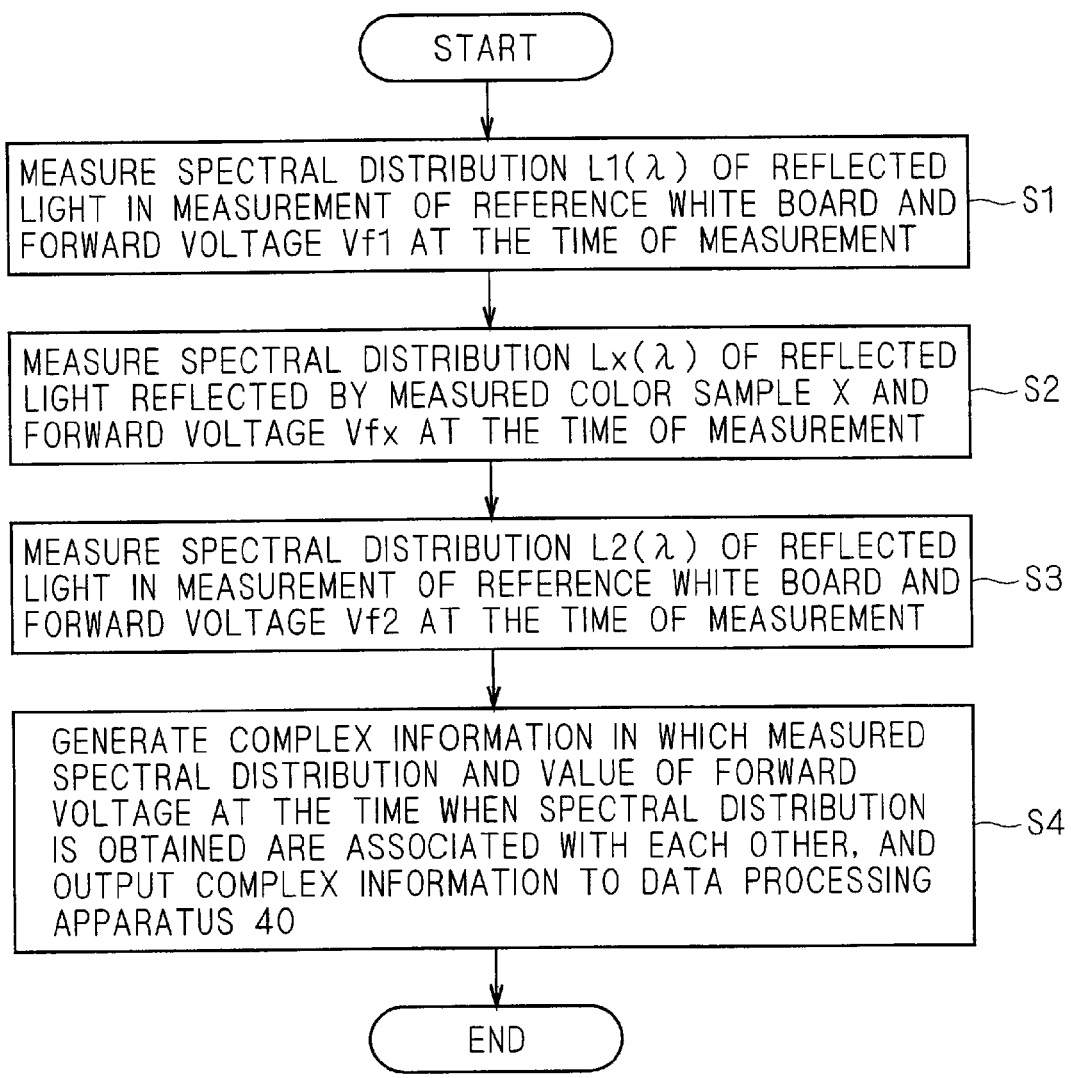
FIG. 5 is a flowchart showing a procedure for a spectral characteristic measuring instrument 30 to generate and output complex information.

FIG. 5 is a flowchart showing a procedure for the spectral characteristic measuring instrument 30 to generate and output complex information in which a spectral distribution obtained from a light-to-be-measured and a value of the forward voltage of the light source 2 at the time when the spectral distribution is obtained are associated with each other. When the spectral characteristic measuring instrument 30 receives a command to measure the spectral distribution $D1(\lambda)$ of the illumination light illuminating the reference white board (reference white surface) 20 and transmits the command to the control section 5, the process moves to step S1. In step S1, the spectral distribution $L1(\lambda)$ of the reflected light in the measurement of the reference white board (reference white surface) 20 and the forward voltage Vf1 at the time of measuring the reference white board (reference white surface) 20, are measured, and the process moves to step S2. In step S2, the spectral distributions $Lx(\lambda)$ of lights reflected respectively by a group of color samples x, and the forward voltages Vfx at the time of measuring the respective color samples x, are measured. In more detail, for a reflected light reflected by one color sample x, a measurement of a spectral distribution and a detection of a forward voltage Vfx are paired and substantially simultaneously performed. Then, when the measurement section 10 reaches a position opposed to the next color sample, the same measurement and detection are performed for the next color sample. In step S3, the forward voltage detection circuit 6a detects the spectral distribution $L2(\lambda)$ of the reflected light in measuring the reference white board (reference white surface) 20 and the forward voltage Vf2 at the time of measuring the reference white board (reference white surface) 20, and the process moves to step S4. In step S4, a signal of complex information in which the measured spectral distribution and the value of the forward voltage of the light source 2 at the time when the spectral distribution is obtained are associated with each other, is generated and outputted to the data processing apparatus 40. Thus, the process for the group of color samples is completed. Here, when the scanning in the X direction moves to the next row of color samples, the operation of feeding the color sample sheet 1 in the Y direction by the distance corresponding to the width of the color patch CP with respect to the Y direction is performed. The movement of the scanning and the feeding operation are performed in synchronization with each other.

Figure 6:
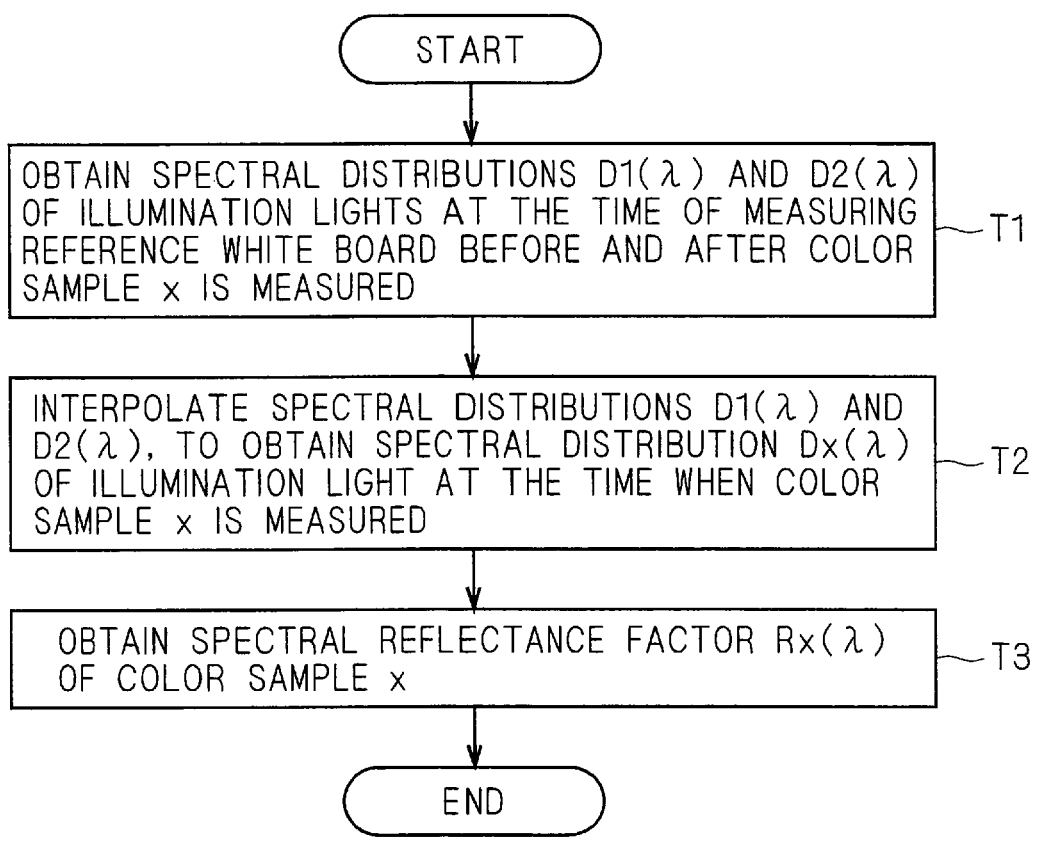
FIG. 6 is a flowchart showing a procedure for a data processing apparatus 40 to obtain spectral reflection characteristics of a color sample 1n by a process including interpolation.

FIG. 6 is a flowchart showing a procedure for the data processing apparatus 40 to obtain spectral reflection characteristics of the color sample 1n by a process including interpolation.

When the signal of the complex information outputted from the spectral characteristic measuring instrument 30 is inputted through the input section 43 to the control section 41 of the data processing apparatus 40, the process moves to step T1.

In step T1, the spectral distributions $D1(\lambda)$ and $D2(\lambda)$ of the illumination lights at the time of measuring the reference white board (reference white surface) 20 before and after the group of color samples x are measured, are obtained. In the cases of the one-way-read scanning mode and the two-way-read scanning mode, considering the color sample sheet 1 as a whole, there are a plurality of measurements results of each of the spectral distributions $D1(\lambda)$ and $D2(\lambda)$ of the illumination lights. Among them, adopted is the measurement result of a before-and-after pair of spectral distributions of the illumination lights which are temporarily closest to the reading of the row including an objective color sample. To be specific, firstly, based on the known spectral reflectance factor R0(λ) of the reference white board (reference white surface) 20 and the spectral distributions L1(λ) and L2(λ) of the reflected lights at the time of measuring the reference white board (reference white surface) 20 before and after the color sample x is measured, the control section 41 of the data processing apparatus 40 obtains the spectral distributions D1(λ) and D2(λ) of the illumination lights at that time, as follows. In the equations (1) and (2), the whole is obtained as a distribution, by numerical calculation being performed for each wavelength λ. The same is applied to the later-described equations in which the wavelength λ, is included as a parameter.

$$D1(\lambda)=L1(\lambda)/R0(\lambda) \quad (1)$$

$$D2(\lambda)=L2(\lambda)/R0(\lambda) \quad (2)$$

In step T2, the spectral distributions D1(λ) and D2(λ) are interpolated, and the spectral distribution Dx(λ) of the illumination light at the time when each color sample x is measured is obtained. Specifically, the spectral distributions D1(λ) and D2(λ) are linearly interporated by using, as the interpolation indexes, voltage differences of the forward voltage Vfx at the time when each color sample x is measured from the forward voltages Vf1 and Vf2 at the time when the reference white board (reference white surface) 20 is measured. Thus, the spectral distribution Dx(λ) of the illumination light at the time when the color sample x is measured is obtained.

$$Dx(\lambda)=D1(\lambda)\cdot(Vf2-Vfx)/(Vf2-Vf1)+D2(\lambda)\cdot(Vfx-Vf1)/(Vf2-Vf1) \quad (3)$$

In step T3, the spectral reflectance factor Rx(λ) of the color sample x is obtained, and the process ends in step T4. Specifically, using the obtained Dx(λ) and the measured spectral distribution Lx(λ) of the reflected light reflected by the color sample x, the spectral reflectance factor Rx(λ) serving as the spectral reflection characteristics of the color sample x is obtained as follows.

$$Rx(\lambda)=Lx(\lambda)/Dx(\lambda) \quad (4)$$

Figure 7:
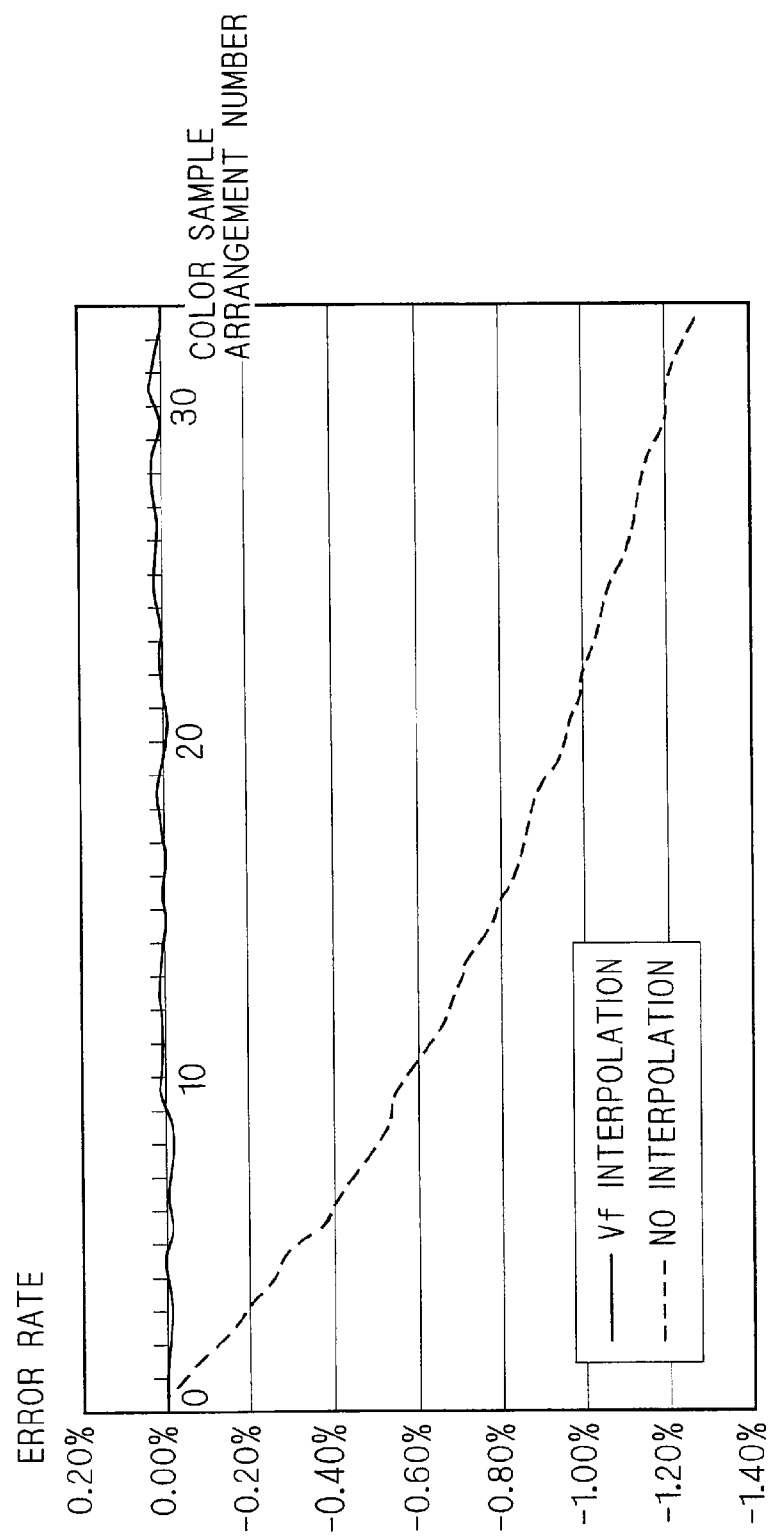
FIG. 7 shows an illustrative example of an error in an estimated intensity at 450 nm, as an example of a spectral distribution of an illumination light.

FIG. 7 shows an illustrative example of an error in an estimated intensity at 450 nm, as an example of the spectral distribution of the illumination light, in a case where, among the two-dimensionally arranged color samples, 31 color samples x arranged in one row are scanned and measured. The horizontal axis of the graph represents the arrangement number of the color sample 1n. The first to thirty-first color samples are arranged. Before and after the color samples are measured, the reference white board (reference white surface) 20 is measured. The vertical axis of the graph represents an error rate.

As a measurement time elapses and a later color sample 1n comes to the measurement, the variation in the illumination light caused by a temperature rise in the LED due to the light emission becomes larger. When no interpolation is performed, an error rate in the spectral distribution of the illumination light at the time when the color sample x is measured is high. The error can be improved by interpolating the spectral distributions D1(λ) and D2(λ) based on the voltage differences of the forward voltage Vfx at the time when the color sample x is measured from the forward voltages Vf1 and Vf2 at the time when the reference white board (reference white surface) 20 is measured, and obtaining the spectral distribution Dx(λ) of the illumination light at the time when the color sample x is measured. That is, in a scanning type color measurement system which sequentially measures a plurality of color samples 1n and in which a semiconductor light-emitting element such as an LED is used as a light source and a reference system is not provided, a variation in an illumination light caused by a temperature rise in the LED due to light emission can be appropriately corrected, and spectral characteristics of the color sample 1n can be obtained with a high accuracy. In the present embodiment, moreover, the reflected light reflected by each color sample 1n and the forward voltage of the LED at that time are measured by scanning, and the reflected light reflected by the reference white board (reference white surface) 20 and the forward voltage of the LED at that time are measured at the beginning and the end of the scanning Therefore, measurements of the lights reflected by a plurality of color samples and measurements of the reflected light reflected by the reference white board (reference white surface) 20 before and after the measurements of the reflected lights reflected by a plurality of color samples can be performed in one scanning, which allows spectral reflection characteristics of a plurality of color samples to be measured at a high speed.

<Second Embodiment>

In a second embodiment, a plurality of semiconductor light-emitting elements having different spectral distributions are used as the light source 2. In measuring the reference white board, a spectral distribution of a reflected light for each of the semiconductor light-emitting elements m and a forward voltage of the semiconductor light-emitting element are measured. Additionally, a spectral distribution of an illumination light at the time when the color sample is measured is estimated for each of the semiconductor light-emitting elements m. The estimated spectral distributions of the illumination lights for the respective semiconductor light-emitting elements m are combined, to obtain a spectral distribution of an illumination light at the time when the color sample is measured. In the second embodiment, the control section 41 of the data processing apparatus 40 realizes functions including an individual estimate section, a combination section, and the like, in addition to the foregoing estimate computation section and the spectral characteristics computation section. The individual estimate section individually estimates the spectral distribution of the illumination light for each of the semiconductor light-emitting elements m, by using the forward voltage detected for the semiconductor light-emitting element as the interpolation index. The combination section combines the estimated spectral distributions of the illumination lights for the respective semiconductor light-emitting elements m, to obtain the spectral distribution of the illumination light at the time when the color sample is measured.

Figure 8:
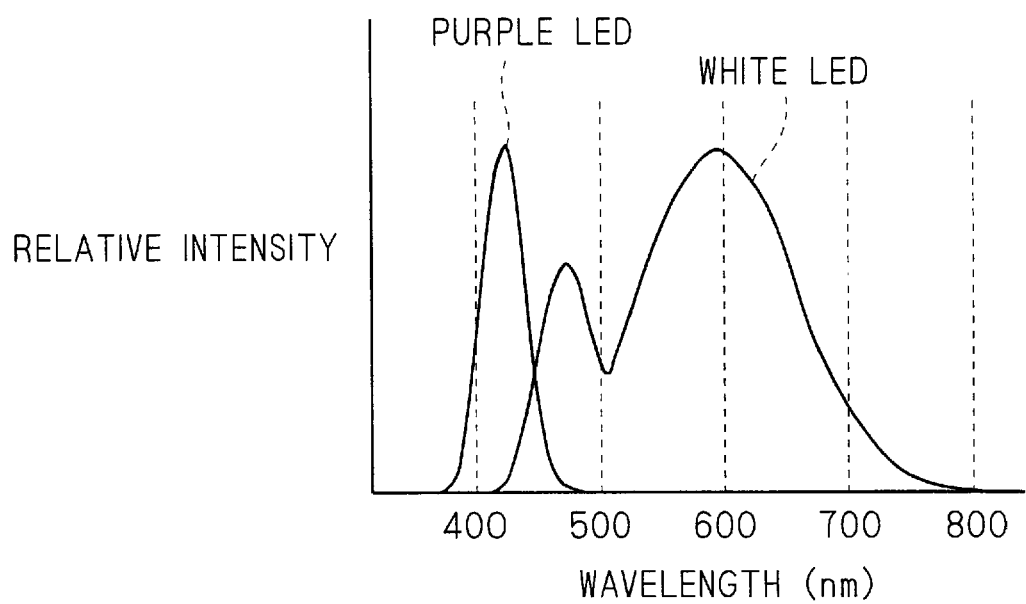
FIG. 8 is a graph showing relative spectral distributions of white and purple LEDs.

FIG. 8 is a graph showing relative spectral distributions of white and purple LEDs. The horizontal axis of the graph represents the wavelength (nm), and the vertical axis of the graph represents the relative intensity.

As shown in FIG. 8, the white LED has no intensity in the range of 400 to 420 nm, and thus a spectral reflectance factor cannot be obtained in the entire range of 400 to 700 nm which is considered to be necessary for a color measurement. However, as shown in FIG. 8, by using the purple LED having an intensity in the range of 400 to 420 nm with a center wavelength of 410 nm in combination with the white LED, the spectral reflectance factor in the entire range of 400 to 700 nm can be obtained. In this case, the spectral distribution of the illumination light is estimated for each LED by the interpolation on the Vf axis described above, and the estimated spectral distributions of the illumination lights of the respective LEDs are combined with each other, so that the spectral distribution of the illumination light at the time when each color sample is measured can be estimated.

Figure 9:
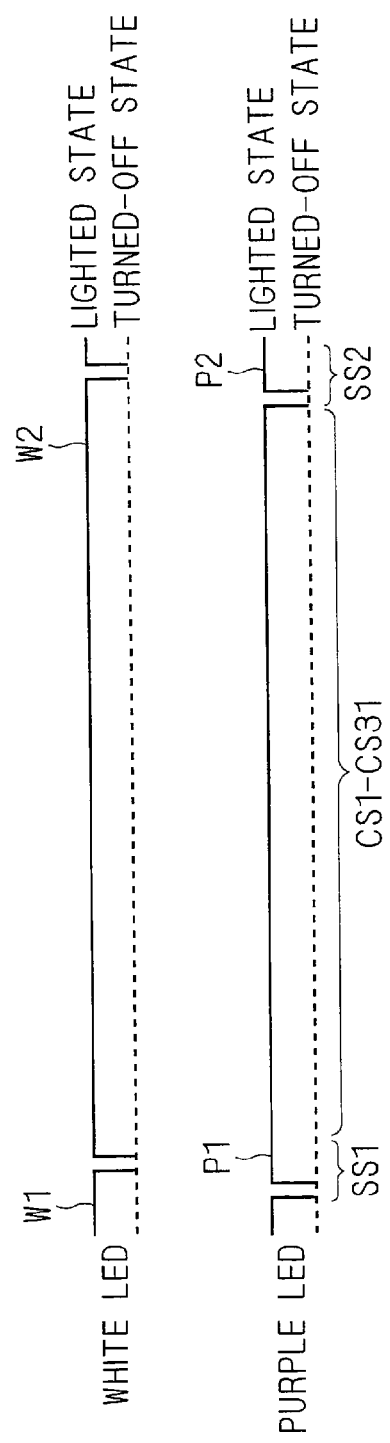
FIG. 9 shows timings of lighting the white LED and the purple LED which serve as the light source 2 in a second embodiment.

FIG. 9 shows timings of lighting the white LED and the purple LED which serve as the light source 2 in the second embodiment. In FIG. 9, the high level represents a state where the LED is lighted, and the 0 level indicated by the broken lines represents a state where the LED is turned off. The horizontal axis represents elapsed time since scanning starts.

As shown in FIG. 9, the control section 5 of the spectral characteristic measuring instrument 30 provides time periods SS1, SS2 for measuring the reference white board (reference white surface) 20 before and after time periods CS1 to CS31 for measuring 31 color samples. In the measurements in the time periods SS1, SS2 for measuring the reference white board (reference white surface) 20, firstly, the purple LED is turned off for a short time to create a state W1, W2 where the white LED is solely lighted, and spectral distributions L1W($\lambda$) and L2W($\lambda$) of reflected lights and forward voltages Vf1W and Vf2W of the white LED are measured. The spectral distributions of the reflected lights are converted into spectral distributions D1W($\lambda$) and D2W($\lambda$) of illumination lights of the white LED, as follows.

$$D1W(\lambda)=L1W(\lambda)/R0(\lambda) \quad (5)$$

$$D2W(\lambda)=L2W(\lambda)/R0(\lambda) \quad (6)$$

Then, the white LED is turned off for a short time to create a state P1,P2 where the purple LED is solely lighted, and spectral distributions L1P($\lambda$) and L2P($\lambda$) of reflected lights and forward voltages Vf1P and Vf2P of the purple LED are measured. The spectral distributions of the reflected lights are converted into spectral distributions D1P($\lambda$) and D2P($\lambda$) of illumination lights of the purple LED, as follows.

$$D1P(\lambda)=L1P(\lambda)/R0(\lambda) \quad (7)$$

$$D2P(\lambda)=L2P(\lambda)/R0(\lambda) \quad (8)$$

It is desirable that the turning-off time is short to such a degree that a temperature drop in each LED is negligible. For estimating a spectral distribution of a white illumination light produced by the white LED and the purple LED which are simultaneously lighted at the time of measuring the color sample x, firstly, the spectral distributions D1W($\lambda$) and D2W($\lambda$) of white LED illumination lights are linearly interpolated by using, as the interpolation indexes, voltage differences of the forward voltage VfxW at the time when the color sample x is measured from the forward voltages Vf1W and Vf2W at the time when the reference white board (reference white surface) 20 is measured. Thus, a spectral distribution DxW($\lambda$) of the illumination light at the time when the color sample x is measured is obtained.

$$DxW(\lambda)=D1W(\lambda)\cdot(Vf2W-VfxW)/(Vf2W-Vf1W)+ \\ D2W(\lambda)\cdot(VfxW-Vf1W)/(Vf2W-Vf1W) \quad (9)$$

Then, in the same manner, a spectral distribution DxP($\lambda$) of a purple LED illumination light at the time when the color sample x is measured is obtained by interpolation.

$$DxP(\lambda)=D1P(\lambda)\cdot(Vf2P-VfxP)/(Vf2P-Vf1P)+D2P(\lambda)\cdot \\ (VfxP-Vf1P)/(Vf2P-Vf1P) \quad (10)$$

Then, a spectral distribution Dx($\lambda$) of the illumination light produced by the two LEDs at the time when the color sample x is measured is obtained by combination of DxW($\lambda$) and DxP($\lambda$).

$$Dx(\lambda)=DxW(\lambda)+DxP(\lambda) \quad (11)$$

The subsequent calculation is the same as the equation (4).

Figure 10:
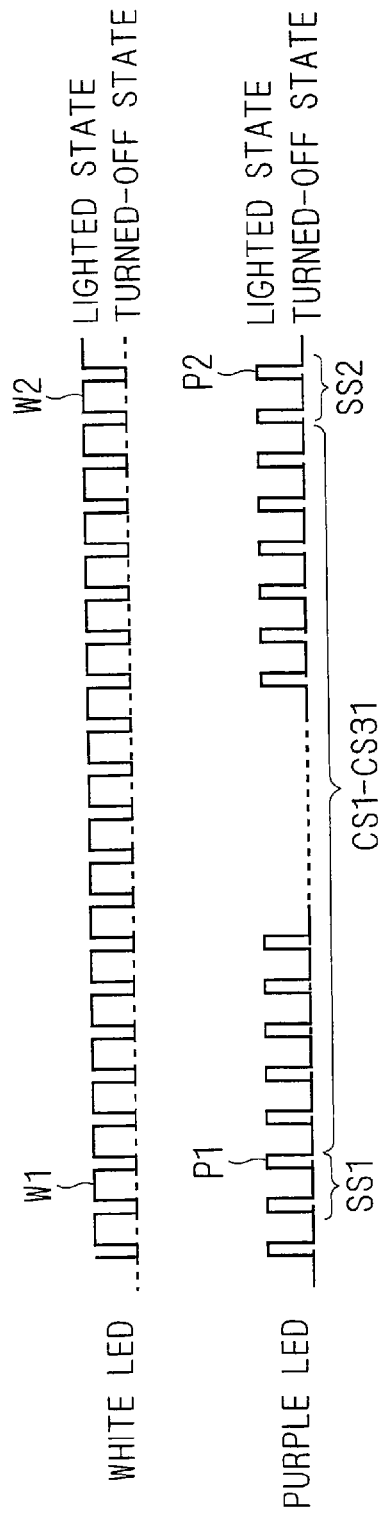
FIG. 10 shows timings of lighting the white LED and the purple LED which serve as the light source 2, in a case where the white LED and the purple LED are alternately lighted.

In the second embodiment, only when the reference white board (reference white surface) 20 is measured, the white LED and the purple LED individually emit a light. However, it may also be acceptable that: the white LED and the purple LED are alternately lighted all the time with a turning-off time being short in such a degree that a temperature drop in each LED is negligible; individually-estimated spectral distributions of illumination lights illuminating the color sample which are produced by the respective LED are combined with each other while spectral distributions of reflected lights reflected by the color sample which correspond to the respective LEDs are also combined with each other; and a spectral reflectance factor of the color sample 1n is calculated based on spectral distributions of the combined illumination light and the combined reflected light. FIG. 10 shows timings of lighting the white LED and the purple LED which serve as the light source 2, in a case where the white LED and the purple LED are alternately lighted. Similarly to FIG. 9, the high level represents the state where the LED is lighted, and the 0 level indicated by the broken lines represents the state where the LED is turned off. The horizontal axis represents elapsed time since scanning starts.

Also in an apparatus of the present embodiment, the error can be improved by: linearly interpolating the spectral distributions D1($\lambda$) and D2($\lambda$) by using, as the interpolation indexes, voltage differences of the forward voltage Vfx at the time when the color sample x is measured from the forward voltages Vf1 and Vf2 at the time when the reference white board (reference white surface) 20 is measured, and thus obtaining the spectral distribution Dx($\lambda$) of the illumination light at the time when the color sample x is measured. Therefore, the same effects as in the above-described embodiment can be achieved.

<Third Embodiment>

In a third embodiment the spectral distributions D1 and D2 of the two illumination lights obtained in the measurement of the reference white board (reference white surface) 20 before and after the color sample 1n is scanned are used to perform interpolation by using, as the interpolation index, a distance (time difference) on the time axis between the times when the spectral distributions D1 and D2 are obtained, and the spectral distribution of the illumination light at the time when the color sample x is measured is estimated. Based on the estimated spectral distribution of the illumination light at the time when the color sample x is measured and the spectral distribution of the reflected light reflected by the illuminated color sample x, the spectral reflection characteristics of the color sample x are obtained in accordance with the equation (4). In this case, the interpolation is linear interpolation using, instead of the forward voltages Vf1, Vf2, and Vfx of the equation (3) of the first embodiment, time indexes Tf1, Tf2, and Tfx which correspond to timings when the respective spectral distributions D1, D2, and Dx are obtained. The same replacement is possible also in the second embodiment.

In the spectral characteristic measuring system according to the third embodiment, the control section 5 of the measurement section 10 generates and outputs complex information in which a spectral distribution obtained from a light-to-be-measured and a measurement time (for example, time information represented by an elapsed time since scanning starts) are associated with each other.

In the case of this embodiment, a time parameter representing an obtaining timing is used as the interpolation index. Such an interpolation index is effective in an approximation considering a change in the LED temperature to be substantially linear with respect to the elapse of time. Further, in an approximation considering scanning of the color sample sheet 1 to be performed at a substantially constant speed, a distance of movement in the X-direction scanning is also usable as the interpolation index.

Moreover, in the respective embodiments described above, the specific examples of quantities of spectral distributions D1, D2, Dx, and the like, are shown. However, in the present invention, the quantities are not limited to these specific examples.

Figure 11:
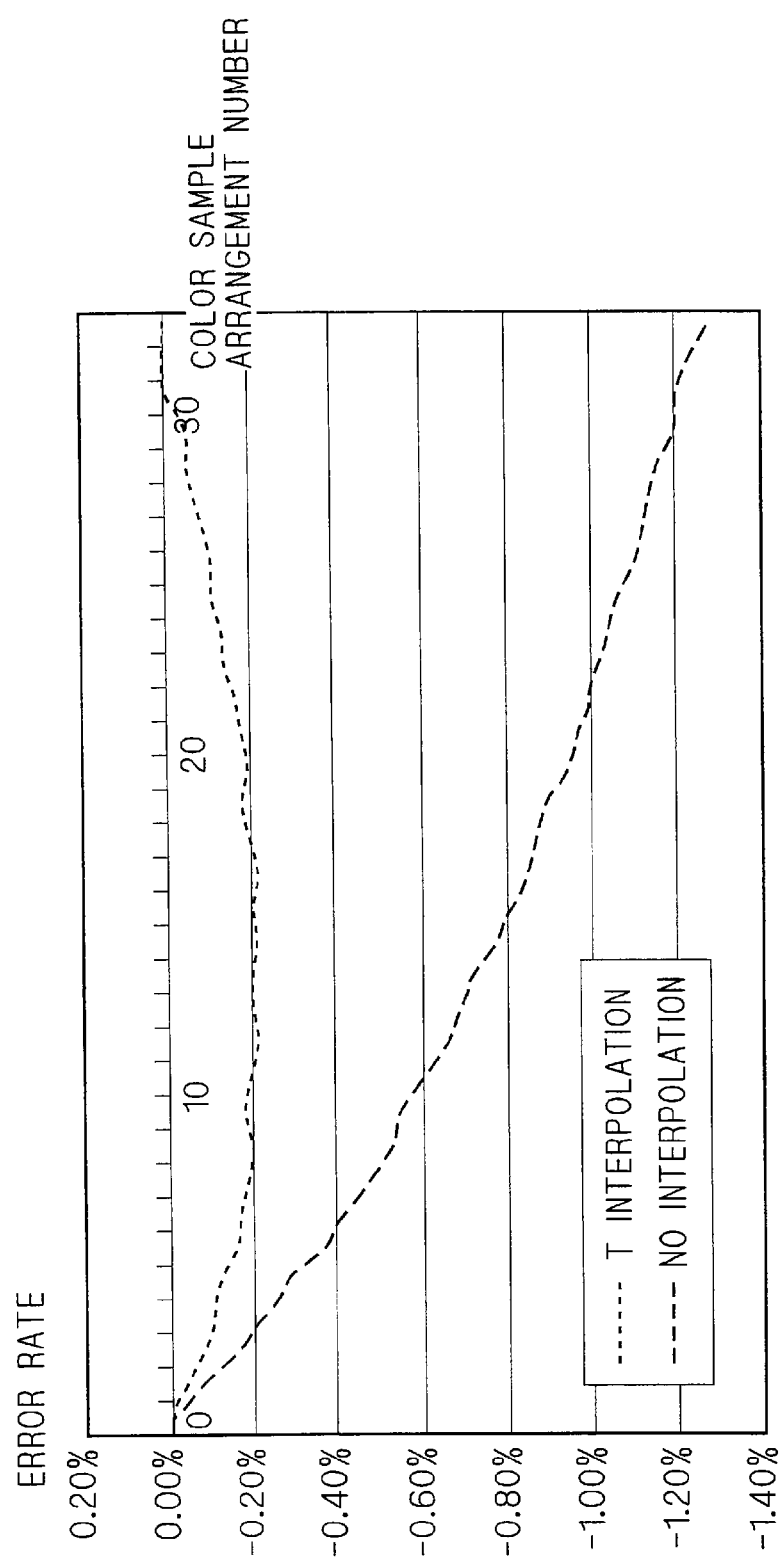
FIG. 11 shows an illustrative example of an error in an estimated intensity at 450 nm, as an example of a spectral distribution of an illumination light in a third embodiment.

FIG. 11 shows an illustrative example of an error in an estimated intensity at 450 nm, as an example of the spectral distribution of the illumination light, in a case where, among the two-dimensionally arranged color samples 1n, 31 color samples arranged in one row are scanned and measured in the third embodiment. The horizontal axis of the graph represents the arrangement number of the color sample 1n. The first to thirty-first color samples are arranged. Before and after the color samples, the reference white board (reference white surface) 20 is measured. The vertical axis of the graph represents an error rate.

As shown in FIG. 11, the error can be improved by performing interpolation based on a distance on the time axis between the times when the spectral distributions D1 and D2 of the reflected lights reflected by the reference white board (reference white surface) 20 are obtained; estimating the spectral distribution of the illumination light at the time when the color sample x is measured; and obtaining the spectral reflection characteristics of the color sample x based on the estimated spectral distribution of the illumination light at the time when the color sample x is measured and the spectral distribution of the reflected light reflected by the color sample x. Therefore, the same effects as in the above-described embodiments can be achieved.

Although the embodiments of the present invention have been described above, the present invention is not limited to the above-described ones.

For example, the present invention can achieve the same effects as in the above-described embodiments, also in a case where the spectral characteristics are measured based on a transmitted light transmitted through the color sample x. In the first embodiment, the spectral characteristics are measured based on the reflected light reflected by the color sample sheet 1, and therefore the reference white board (reference white surface) 20 is provided. However, in the case where the spectral characteristics are measured based on the transmitted light transmitted through the color sample x, a spectral distribution of a transmitted light transmitted through a reference transmission sample having known spectral transmission characteristics is obtained. The reference transmission sample can be realized either by providing a transparent plate or providing nothing.

The measurement section of the spectral characteristic measuring instrument and the color sample sheet 1 are transported to be brought into opposition to each other at the time of the measurement, but this is not limitative. Only the measurement section of the spectral characteristic measuring instrument or only the color sample sheet 1 may be transported to bring the measurement section and the color sample sheet 1 into opposition to each other.

In the above-described embodiments, the data processing apparatus is independent of the spectral characteristic measuring instrument. However, the respective sections of the spectral characteristic measuring system may be realized by a computer provided inside the spectral characteristic measuring instrument.

These modifications can also achieve the same effects as in the above-described embodiments.

The invention claimed is:

1. A spectral characteristic measuring system which obtains spectral characteristics of a color sample by using an illumination light from a semiconductor light-emitting element, said spectral characteristic measuring system comprising:

a measurement control section that controls a measurement section so as to measure a spectral distribution L1 corresponding to said illumination light to obtain a spectral distribution D1 of said illumination light, then measure a spectral distribution Lx of a reflected light or a transmitted light reflected by or transmitted through said color sample illuminated by said illumination light, and then measure a spectral distribution L2 corresponding to said illumination light to obtain a spectral distribution D2 of said illumination light;

an interpolation section that estimates a spectral distribution Dx of said illumination light at the time when said spectral distribution Lx of the reflected light or the transmitted light reflected by or transmitted through said color sample illuminated by said illumination light is measured, by interpolating said spectral distribution D1 obtained based on said spectral distribution L1 and said spectral distribution D2 obtained based on said spectral distribution L2; and a spectral characteristics computation section that obtains spectral characteristics Cx of said color sample based on said spectral distribution Lx and said spectral distribution Dx.

2. The spectral characteristic measuring system according to claim 1, wherein said measurement section includes a forward voltage detection section that detects a forward voltage Vf1 of said semiconductor light-emitting element at a timing when said spectral distribution L1 is measured, a forward voltage Vf2 of said semiconductor light-emitting element at a timing when said spectral distribution L2 is measured, and a forward voltage Vfx of said semiconductor light-emitting element at a timing when said spectral distribution Lx is measured, said interpolation section performs calculation for estimating said spectral distribution Dx by interpolating said spectral distributions Dl and D2 using a value of said forward voltage as the parameter for interpolation based on values of said forward voltages Vf1, Vf2, and Vfx.

3. The spectral characteristic measuring system according to claim 2, wherein said spectral characteristic measuring system includes a plurality of semiconductor light-emitting elements that emit lights with different spectral distributions, the measurement of said spectral distributions L1 and L2 is performed with respect to each of said semiconductor light-emitting elements, by individually and sequentially lighting said plurality of semiconductor light-emitting elements, and on the other hand, the measurement of said spectral distribution Lx is performed by simultaneously lighting said plurality of semiconductor light-emitting elements, said forward voltage detection section detects a forward voltage of each of said semiconductor light-emitting elements, said interpolation section includes:

an individual estimate section that individually estimates a spectral distribution Dxm of an illumination light emitted from each of said semiconductor light-emitting elements by using, as interpolation parameters, values of said forward voltages detected with respect to each of said semiconductor light-emitting elements; and a combination section that combines said spectral distribution Dxm which has been estimated by said individual estimate section with respect to each of said semiconductor light-emitting elements, to obtain said spectral distribution Dx.

4. The spectral characteristic measuring system according to claim 1, wherein
a color sample sheet in which a plurality of color samples are arranged is used as a collection of said color samples,
timings of measuring the spectral distributions Lx of the reflected lights or transmitted lights reflected by or transmitted through said plurality of color samples, respectively, illuminated by said illumination lights are sequential along time,
the interpolation computation performed by said interpolation section for estimating said spectral distribution Dx is performed with respect to each of the timings of measuring the spectral distributions Lx of the reflected lights or transmitted lights reflected by or transmitted through said plurality of color samples, respectively, illuminated by said illumination lights.

5. The spectral characteristic measuring system according to claim 1, wherein
said interpolation section performs the interpolation computation by using, as interpolation parameters, time differences between ones of timings of measuring said spectral distributions L1, Lx, and L2.

6. The spectral characteristic measuring system according to claim 1, wherein
said spectral distributions L1 and L2 are obtained by, while illuminating a reference sample having predetermined spectral characteristics by means of said semiconductor light-emitting element, measuring a reflected light or a transmitted light reflected by or transmitted through said reference sample.

* * * * *